(12) United States Patent
Mazumder

(10) Patent No.: US 8,795,812 B2
(45) Date of Patent: Aug. 5, 2014

(54) OLEOPHOBIC GLASS SUBSTRATES

(75) Inventor: Prantik Mazumder, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 667 days.

(21) Appl. No.: 13/027,396

(22) Filed: Feb. 15, 2011

(65) Prior Publication Data

US 2011/0206903 A1    Aug. 25, 2011

Related U.S. Application Data

(60) Provisional application No. 61/307,500, filed on Feb. 24, 2010.

(51) Int. Cl.
| | | |
|---|---|---|
| B32B 3/00 | (2006.01) | |
| B32B 17/06 | (2006.01) | |
| B05D 5/06 | (2006.01) | |
| B05D 3/00 | (2006.01) | |
| C03C 17/28 | (2006.01) | |
| C03C 17/30 | (2006.01) | |

(52) U.S. Cl.
CPC ............. *C03C 17/28* (2013.01); *C03C 2204/08* (2013.01); *C03C 2217/75* (2013.01); *C03C 17/30* (2013.01)
USPC ........... 428/161; 428/141; 428/156; 428/426; 427/299; 427/165; 264/239; 264/284; 264/293; 264/400

(58) Field of Classification Search
USPC ................. 428/141, 156, 167, 426, 421, 161; 427/164, 165, 299; 264/239, 284, 293, 264/400
See application file for complete search history.

(56) References Cited

U.S. PATENT DOCUMENTS

| | | |
|---|---|---|
| 2004/0237590 A1 | 12/2004 | Sakoske et al. |
| 2006/0024478 A1 | 2/2006 | D. Urso et al. |
| 2006/0091123 A1 | 5/2006 | Chen |
| 2007/0141114 A1 | 6/2007 | Muisener et al. |
| 2008/0047940 A1 | 2/2008 | Li et al. |
| 2008/0199659 A1 | 8/2008 | Zhao |
| 2008/0286548 A1 | 11/2008 | Ellison et al. |
| 2009/0014416 A1 | 1/2009 | Gandon et al. |
| 2009/0142568 A1 | 6/2009 | Dejneka et al. |
| 2010/0058607 A1 | 7/2009 | Lee et al. |

(Continued)

FOREIGN PATENT DOCUMENTS

| | | |
|---|---|---|
| WO | 2008036074 A2 | 3/2008 |
| WO | 2009009185 A2 | 1/2009 |
| WO | 2009099615 A1 | 8/2009 |
| WO | 2010129462 A1 | 11/2010 |

OTHER PUBLICATIONS

Abdelsalam, Mamdouh E., "Wetting of Regularly Structured Gold Surfaces," Langmuir 2005, 21, 1753-1757, 2005 American Chemical Society.

(Continued)

*Primary Examiner* — Catherine A Simone
(74) *Attorney, Agent, or Firm* — Timothy M. Schaeberle; Payal A. Patel

(57) ABSTRACT

A glass substrate having an oleophobic surface. The surface is substantially free of features that form a reentrant geometry and includes a plurality of gas-trapping features extending from the surface to a depth below the surface and a coating comprising at least one of a fluoropolymer and a fluorosilane. The gas-trapping features are substantially isolated from each other, and trap gas below droplets to prevent wetting of the surface.

27 Claims, 9 Drawing Sheets

(56) References Cited

U.S. PATENT DOCUMENTS

| | | |
|---|---|---|
| 2009/0215607 A1 | 8/2009 | Dejneka et al. |
| 2009/0220761 A1 | 9/2009 | Dejneka et al. |
| 2009/0297772 A1 | 12/2009 | Tanii |
| 2009/0304996 A1 | 12/2009 | Kishikawa et al. |
| 2010/0009154 A1 | 1/2010 | Allan et al. |
| 2010/0035038 A1 | 2/2010 | Barefoot et al. |
| 2010/0279068 A1 | 11/2010 | Cook et al. |

OTHER PUBLICATIONS

Tuteja, Anish, "Design Parameters for Superhydrophobicity and Superoleophobicity," MRS Bulletin, vol. 33, Aug. 2008.

OLEOPHOBIC GLASS SUBSTRATES

CROSS-REFERENCE TO RELATED APPLICATIONS

This application claims the benefit of priority under 35 U.S.C. §119(e) of U.S. Provisional Application Ser. No. 61/307,500 filed on Feb. 24, 2010.

BACKGROUND

The disclosure relates to glass substrates having surfaces that are oleophobic. More particularly, the disclosure relates to glass substrates having surfaces that are free of multiscale structures such as reentrant, overhang, or fractal structures, and are either oleophobic or superoleophobic.

Non-wetting substrates that are formed through surface chemistry and surface texturing are being increasingly employed in applications such as micro-fluidics, MEMS, hand-held devices, touch screen applications, and the like, in which a surface that is repellant to water and/or organic (i.e., oils) fluids is desired. The non-wetting characteristics of a substrate, such as, for example, a glass substrate, is usually classified in terms of the static contact angle of a small liquid droplet placed on the substrate, wherein the dimension of the droplet is smaller than the capillary length of the liquid. If the working liquid is an oil, the substrate is characterized as being oleophilic (i.e., wetting) if the static contact angle between the oil droplet and the substrate is less than 90°; or oleophobic (non-wetting) if the static contact angle between the oil droplet and the substrate is greater than 90°; or superoleophobic if the static contact angle between the oil droplet and the substrate is greater than 150°.

Surface roughness can, in some instances, enhance the wetting and/or non-wetting characteristics of a substrate. If the static contact angle of a liquid on a flat surface is greater than 90° or if the original flat surface is non-wetting with respect to the liquid, that surface could be made even more non-wetting with respect to the liquid by adding roughness to the surface. Certain material surfaces, such as TEFLON™ are non-wetting with respect to water (contact angle ~110°) even when the surface is perfectly flat. Such substrates can be made superhydrophobic by providing the substrate surface with a rough geometry that may include simple geometric structures, such as cones, cylinders, posts, or the like.

In contrast, synthetic or naturally occurring oleophobic substrates that are perfectly flat are generally not known. The surface tension of oils and other organic liquids is very low, and the contact angle of oil on a perfectly flat surface is less than 90°; i.e., the perfectly flat surface is oleophilic. Accordingly, the oleophobic state and, particularly, the superoleophobic state are metastable on simple surface geometries such as cones, posts, cylinders, and the like. This metastability leads to a transition on simple rough surfaces to the oleophilic or wetting state. The few known cases of oleophobic and superoleophobic substrates are made through creation of multiscale structures with reentrant, overhang and fractal geometries.

SUMMARY

A glass substrate having an oleophobic surface is provided. The surface is substantially free of multiscale features that form a reentrant geometry and includes a plurality of gas-trapping features extending from the surface to a depth below the surface and a low surface energy organosilane coating disposed on the surface and the gas-trapping features. The gas-trapping features are substantially isolated from each other, and serve to trap gas below droplets to prevent transition of a fluid droplet on the surface to a fully wetting state.

Accordingly, one aspect of the disclosure is to provide a glass substrate comprising an oleophobic surface that is substantially free of features that form a reentrant geometry.

A second aspect of the disclosure is to provide a glass substrate having an oleophobic surface. The oleophobic surface comprises: a surface, wherein the surface is substantially free of features that form a reentrant geometry, and wherein the surface has an open fraction in a range from about 0.40 up to about 0.95; a plurality of gas-trapping features, wherein each of the gas-trapping features is open to the surface and extends to a depth below the surface, and wherein the features are isolated from each other; and a coating disposed on the surface and the plurality of gas trapping features, the coating comprising at least one of a low surface energy fluoropolymer and a low surface energy fluorosilane.

A third aspect of the disclosure is to provide a method of making a glass substrate having an oleophobic surface. The method comprises the steps of: providing a glass substrate having a surface; forming a plurality of gas-trapping features in the surface, wherein each of the gas-trapping features is open to the surface and extends to a depth below the surface, wherein the features are isolated from each other, and wherein the surface has an open fraction in a range from about 0.40 up to about 0.95 after forming the plurality of gas-trapping features; and coating the surface and the plurality of gas trapping features with at least one of a low surface energy fluoropolymer and a low surface energy fluorosilane to form the oleophobic surface on the glass substrate.

These and other aspects, advantages, and salient features will become apparent from the following detailed description, the accompanying drawings, and the appended claims.

BRIEF DESCRIPTION OF THE DRAWINGS

FIG. 6 is a plot of contact angles calculated for Cassie-Baxter (C) and Wenzel (W) states as a function of the ratio b/a;

DETAILED DESCRIPTION

Figure 1:
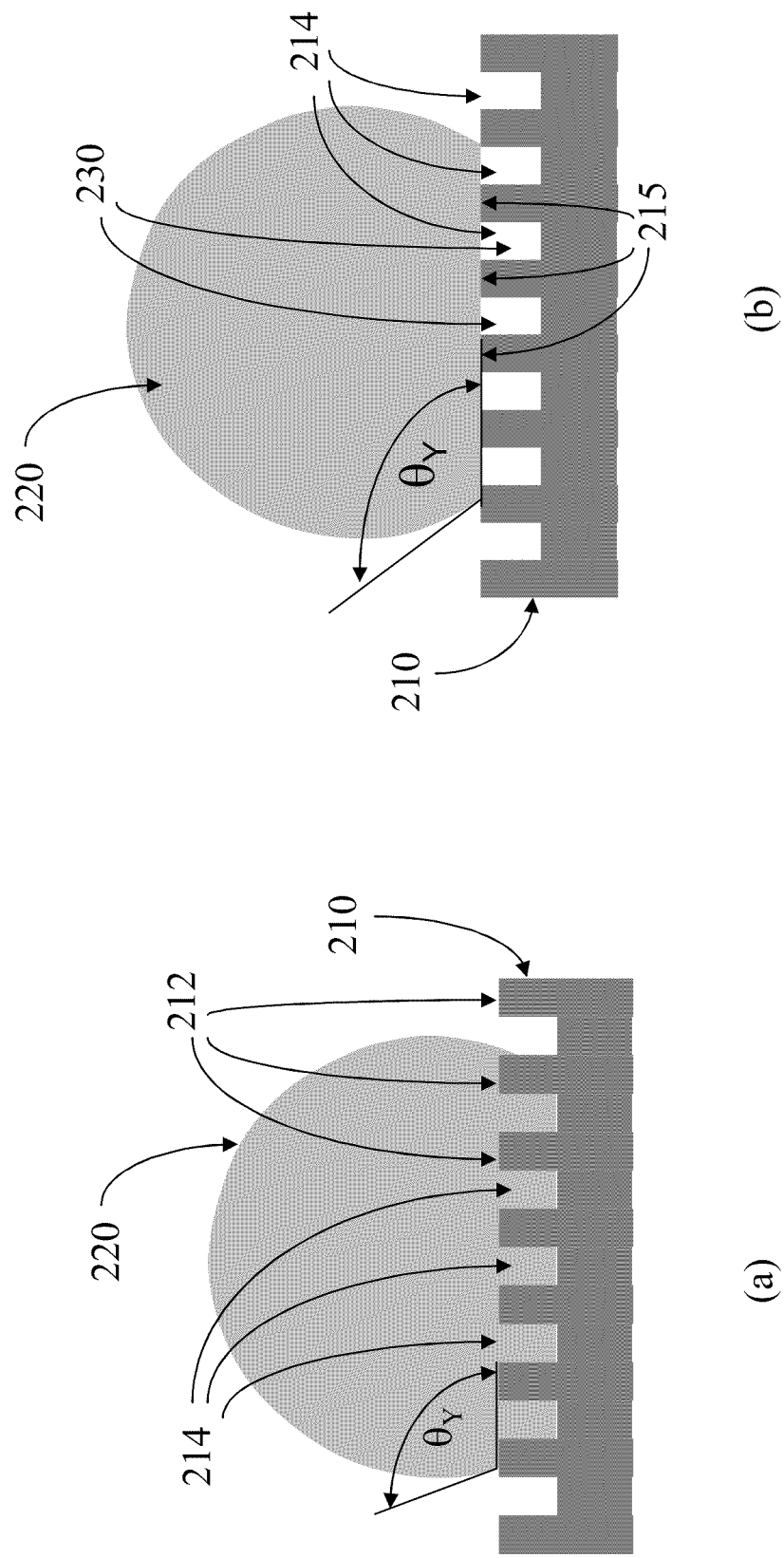
FIG. 1a is a schematic cross-sectional representation of the Wenzel state.
FIG. 1b is a schematic cross-sectional representation of the Cassie-Baxter state.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range.

Referring to the drawings in general, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As used herein, the term "oleophilic" refers to the state in which the contact angle (CA) between a droplet of oil and a solid surface is less than 90°. As used herein, the term "oleophobic" refers to the state in which the contact angle (CA) between a droplet of oil and a solid surface is greater than 90°, and the term "superoleophobic" refers to the state in which the contact angle between a droplet of oil and a solid surface is greater than 150°.

The contact angle of a liquid on a surface of a substrate depends on the surface energy of the glass substrate and the roughness of the surface. If the surface is perfectly smooth, then the contact angle depends only on the surface energy of the surface and in this case the static CA is determined by the Young force balance condition at the triple line according to the equation:

$$\cos\theta_Y = \frac{\gamma_{SV} - \gamma_{SL}}{\gamma_{LV}}, \qquad (1)$$

where $\theta_Y$ is the Young contact angle on a perfectly flat surface, $\gamma_{SV}$ is the surface energy of the solid-vapor interface, $\gamma_{SL}$ is the interfacial energy between the liquid and solid, and $\gamma_{LV}$ is the liquid-vapor surface energy (also known as the surface tension of the liquid in the atmosphere of a specific vapor phase). From the above expression, it is clear that a very low value of $\gamma_{SV}$ or surface energy of the solid surface is required to produce a super non-wetting condition on a perfectly flat surface. The maximum CA values obtained on flat surfaces of natural and synthetic substrates are about 120° for water and about 70-80° for oil.

Surface roughness can enhance either wetting or non-wetting characteristics of a substrate. Assuming that the size of a liquid droplet is much larger than that of the roughness features (e.g., pillars, posts, protrusions, pits, depressions and the like), a liquid droplet placed on a roughened surface can assume either of two limiting configurations: the Wenzel state (FIG. 1a) or the Cassie-Baxter state (FIG. 1b). In the Wenzel state, the liquid droplet 220 fully invades the space 214 between pillars or protrusions 212 and all the solid surface underneath liquid drop 220 is wetted by the liquid. The contact angle $\theta_W$ in this state is given by the well-established Wenzel model:

$$\cos\theta_W = r_W \cos\theta_Y, \qquad (2)$$

where $r_W$ is the roughness factor. Roughness factor $r_W$ is defined as the ratio between the actual wetted area and the projected planar area, and is therefore always greater than unity. A direct consequence of the Wenzel model is that if the original substrate is non-wetting with respect to a liquid, then the roughened surface is even more non-wetting with respect to the same liquid; i.e., if the flat surface contact angle $\theta_Y$ is greater than 90°, then the roughened surface contact angle $\theta_W$ is greater than $\theta_Y$ (90°<$\theta_Y$<$\theta_W$). By creating roughness on an intrinsically hydrophobic substrate such as TEFLON™ (polytetrafluoroethane) or a surface coated with polyfluorosilanes such as DC2604, manufactured by Dow Corning, it is possible to achieve a super-hydrophobic state in the Wenzel state. Conversely, if the original substrate is wetting with respect to the liquid, then the roughened surface exhibits even greater wetting with respect to the liquid; i.e., if the flat surface contact angle $\theta_Y$ is less than 90°, then the roughened surface contact angle $\theta_W$ is less than $\theta_Y$ (90°>$\theta_Y$>$\theta_W$). In the case of oil, there is no known material for which the Young contact angle $\theta_Y$ on a flat surface is greater than 90° (even a smooth TEFLON™ surface has a contact angle of about 80°). As long as the Young contact angle $\theta_Y$ of an oil droplet on a substrate is less than 90°, an oleophobic state cannot be achieved by roughening the substrate if the oil droplet assumes the Wenzel state on the rough substrate.

Alternatively, a liquid droplet can also assume the Cassie-Baxter configuration shown in FIG. 1b, in which droplet 220 sits on the top of the rough surface 215 without invading the space 214 between pillars/protrusions. Much of the liquid surface thus can be suspended in air without touching any solid surface. The Cassie-Baxter state is also known as the composite state, as a composite interface, comprising liquid-solid and liquid-air interfaces which coexist to create the overall interface shape. In this instance, a very large contact angle can be attained if much of the liquid surface can be suspended in air. The contact angle $\theta_{CB}$ in this configuration is expressed as:

$$\cos\theta_{CB} = -1 + f(1 + r_f \cos\theta_Y), \qquad (3)$$

where f is the fraction of solid-liquid interface (the fraction of the total interface that is a solid-liquid interface) and $r_f$ is the roughness factor of the wetted area. As can be seen from equation (3), a lower solid-liquid interface fraction f results in a greater contact angle $\theta_{CB}$. In the extreme case where f=0, the contact angle is 180° and the situation corresponds to the case in which to the liquid droplet is fully suspended in air. In the other extreme case where f=1, the configuration state corresponds to the fully wetted Wenzel state.

The Cassie-Baxter state shown in FIG. 1b is unconditionally unstable on regular geometric surfaces if the Young contact angle $\theta_Y$ on a flat substrate surface is less than 90°, such as for example, in the instance of oil. If the Young contact angle $\theta_Y$ on a flat surface is greater than 90° (such as, for example, for water), then the Cassie-Baxter state is either metastable or stable, depending on size of the roughness features the design parameters.

Figure 2:
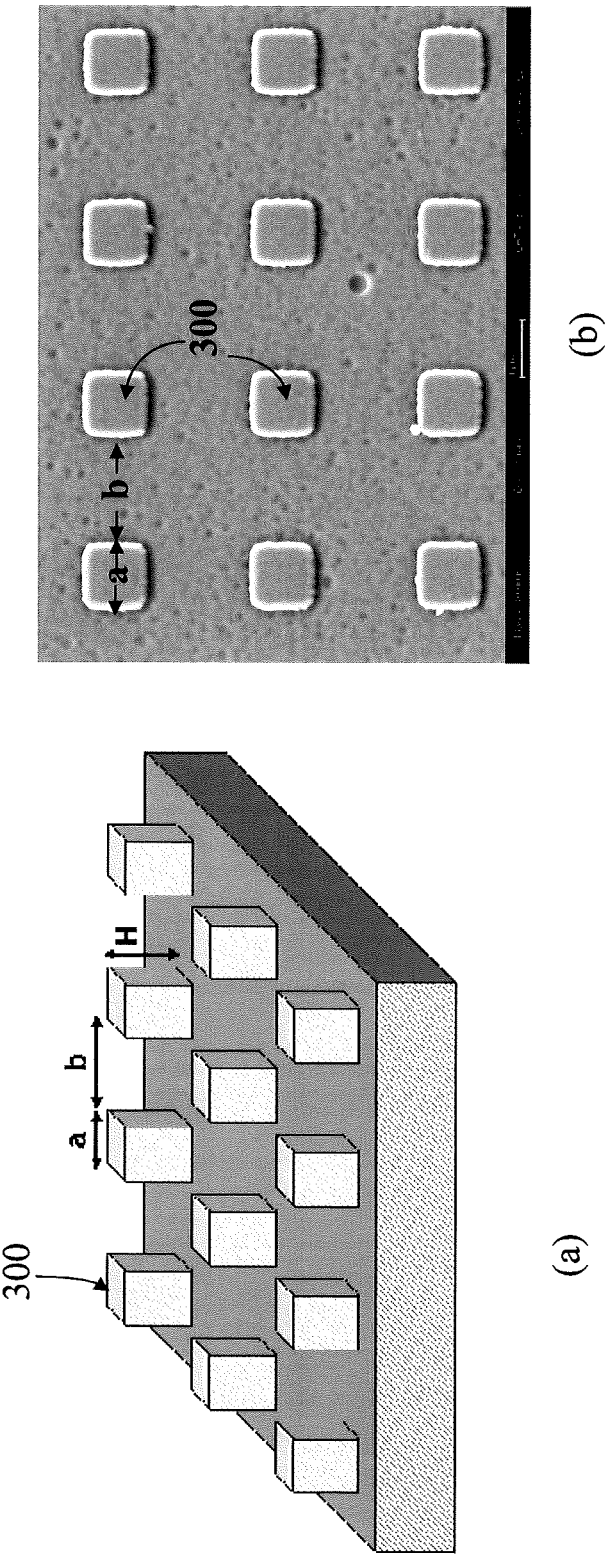
FIG. 2a is a schematic representation of a roughened glass surface having a plurality of surface protrusions.
FIG. 2b is a scanning electron microscope image of a top view of a roughened glass having a plurality of surface protrusions.

Since the Young contact angle $\theta_Y$ of oil is less than 90° on flat surfaces (the maximum Young CA that has been achieved is approximately 80°), it is difficult to achieve the Cassie-Baxter state on simple rough surfaces, such as those protrusions 300 that are schematically shown in a perspective view in FIG. 2a and in FIG. 2b, which is a scanning electron microscope (SEM) image of a top view of a substrate. Oil has a natural tendency to invade the inter-pillar spaces (b in FIGS. 2a and 2b) and transition into the Wenzel state. This transition from the Cassie-Baxter state to the Wenzel state is known as the wetting transition. As previously described herein, if the Young contact angle $\theta_Y$ is less than 90°, then the Wenzel state contact angle $\theta_W$ will be even smaller. The creation of an oleophobic or super-oleophobic surfaces through surface roughening therefore poses a serious challenge.

Accordingly, a glass substrate having a surface that exhibits oleophobic properties (i.e., the surface is oleophobic) is provided. In some embodiments, the surface of the glass substrate is superoleophobic.

The surface of the glass substrate is substantially free of structures that provide the surface with a reentrant geometry. Surfaces having a reentrant geometry typically include a protruding portion configured to protrude toward a liquid and a reentrant portion opposite the protruding portion. Such reentrant geometries provide metastability to the composite liquid-solid state and prevent or slow the transition of fluid droplets on a roughened surface from a Cassie-Baxter state to a Wenzel state. Reentrant geometries and structures can include, for example, hierarchal geometries which in turn include features, particles, or coatings that create protuberances on the surface; fractal geometries; and overhanging structures such as nano- or micro-nails, reverse nano- and micro-nails, or the like.

Figure 3:
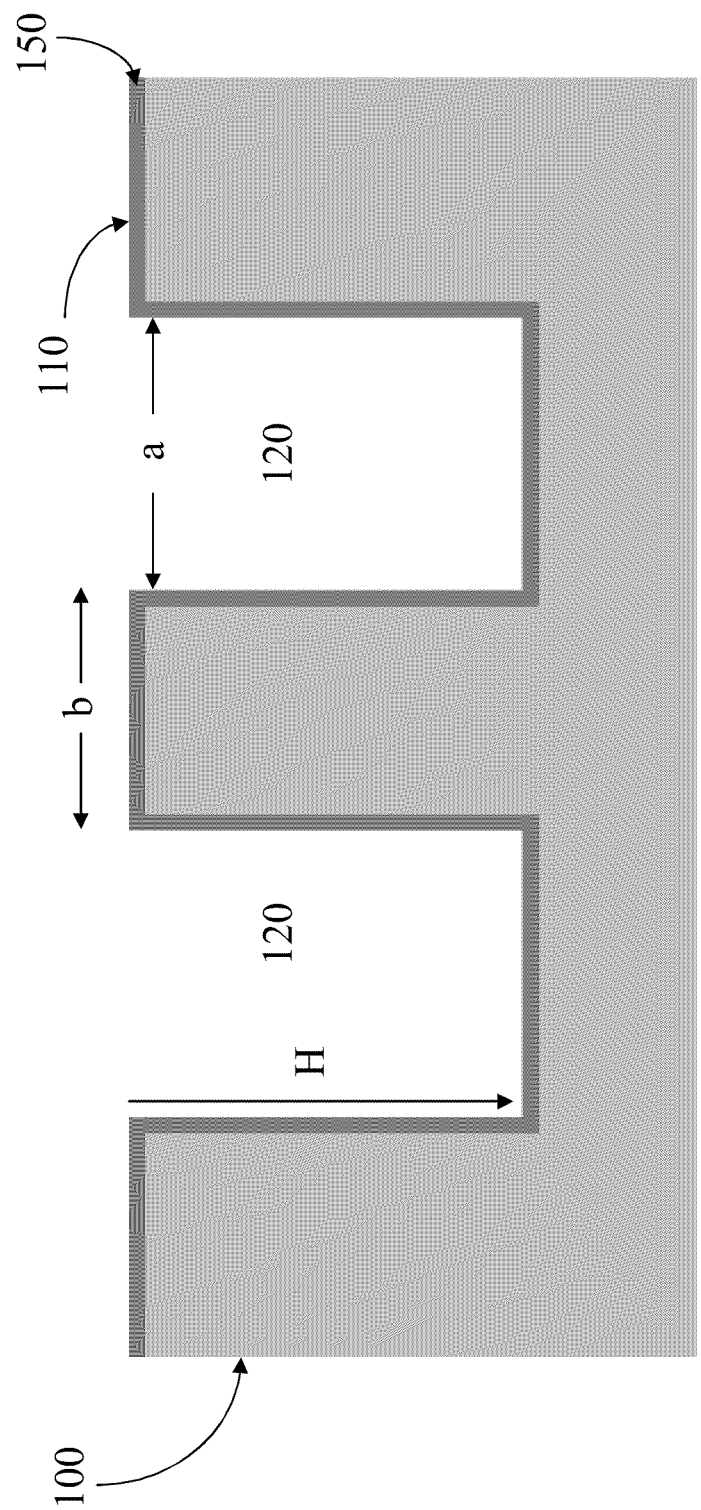
FIG. 3 is a schematic cross-sectional representation of a glass substrate, having gas-trapping features.

In one embodiment, the glass substrate comprises a plurality of gas-trapping features. A schematic cross-sectional view of the glass substrate, showing such gas-trapping features, is shown in FIG. 3. Each of the gas-trapping features 120 has a dimension (e.g., a radius for circular/cylindrical features as shown in FIG. 3, a side for a rectangular or square feature, or a diagonal for other polygonal or irregular features) a, is open to the surface 110 of glass substrate 100, and extends to a depth H below surface 110. Adjacent gas-trapping features 120 are separated by distance b. Gas-trapping features 120 are substantially isolated from each other. That is, although gas-trapping features 120 may be in fluid communication with each other through porosity that is inherently present in glass substrate 100 (porosity of the glass substrate is dependent on the nature or composition of the glass substrate), gas-trapping features 120 are not in fluid communication with each other, aside from their intersecting surface 110 of glass substrate 100, nor is such fluid communication actively or intentionally established. Gas-trapping features 120 include, but are not limited to, cavities, pores, depressions, holes, or the like that are substantially isolated from each other. In some embodiments, gas-trapping features 120 each have at least one wall and, optionally, a base or floor that together define a cavity that is isolated and does not interact with other cavities or other gas-trapping features present on the surface 110 of the glass substrate 100.

Gas-trapping features 120 physically trap gas when a liquid drop 130 is located on surface 110, covering and partially invading features 120. This effect is schematically shown in FIGS. 4a and 4b for instances in which the liquid meniscus 135 either has an upwardly concave shape (FIG. 4b), such as that observed for water, and a downwardly concave shape, such as observed for oils (FIG. 4a), respectively. In the absence of any pathway to the atmosphere, gas 140 cannot escape from gas-trapping feature 120 and becomes more gradually compressed as liquid droplet 130 penetrates into space within gas-trapping feature 120. The vertical component of the surface tension force of liquid droplet 130 is directed upward in the case of water (FIG. 4b), and downward in the case of oil (FIG. 4a). As meniscus 135 starts to invade gas-trapping feature 120 to a depth h, gas 140 remains physically trapped in the absence of any pathway to the atmosphere above glass substrate 100, and is gradually compressed. This effect is contrasted with that observed where the surface of the glass substrate comprises a structure having interconnected protrusions, depressions, and/or simple geometric structures, such as protrusions or posts 300 shown in FIGS. 2a and 2b. In this instance, an interconnected pathway between pillars, posts, grooves, cavities, depressions, pores, or the like is always present. Consequently, the gas molecules underneath the meniscus are eventually displaced, allowing for further invasion of the depressions or cavities, especially in the case of oil, where the liquid meniscus is downwardly concave and the vertical component of the surface tension force is directed downward.

Gas molecules in gas-trapping features 120 actively support the stability of meniscus 135. As meniscus 135 penetrates into a gas-trapping feature 120, such as a cavity or the like, the gas molecules are compressed, creating a situation that can be likened to a piston-cylinder assembly. As the meniscus 135 moves further into gas-trapping feature 120, gas 140 is further compressed, and the pressure of the gas 140 in gas-trapping feature 120 correspondingly increases. The pressure increase provides an opposing force to the motion of meniscus 135, thus preventing full penetration of meniscus 135 into gas-trapping feature 120. Equilibrium is reached when the pressure of the compressed gas 140 balances the capillary pressure. A static condition could be achieved without the need of reentrant or overhang geometry, even in those instances where meniscus 135 is downwardly concave, as shown in FIG. 4a.

Figure 5:
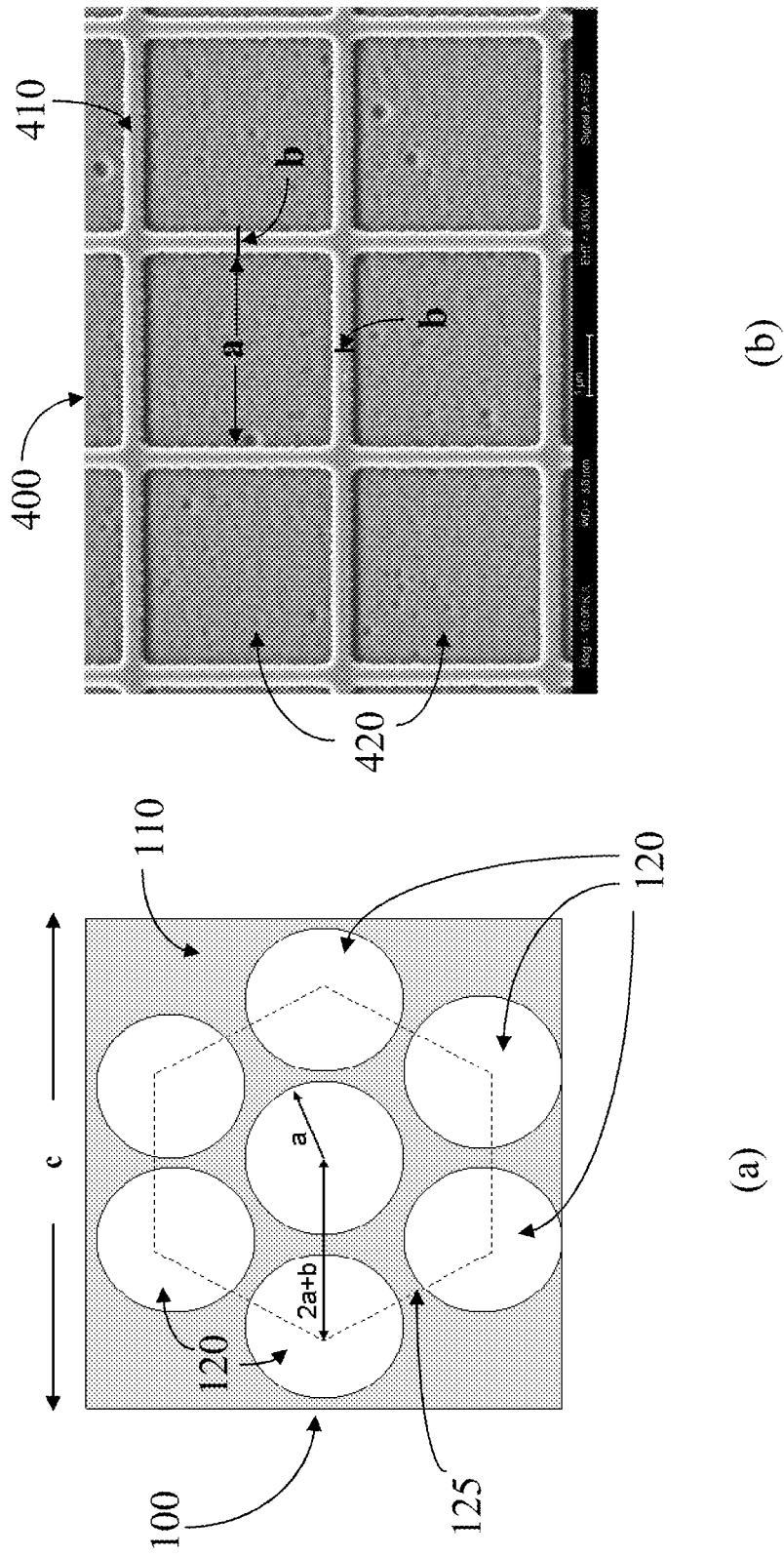
FIG. 5a is a schematic top view of an oleophobic surface comprising an array of non-interacting, cylindrical gas-trapping holes.
FIG. 5b is a scanning electron microscope image of a glass substrate having an array of square gas trapping features.

A top view of a non-limiting example of glass substrate 100 having an oleophobic surface is schematically shown in FIG. 5a. Surface 110 comprises an array of non-interacting, cylindrical gas-trapping holes 120 arranged in a hexagonal lattice 125. Each of holes 120 has radius a and height H. Adjacent holes 120 are separated by distance b. A side view of cylindrical holes 120 is schematically shown in FIG. 3. While the embodiment shown in FIG. 5a shows an ordered array of circular or cylindrical holes, it is not necessary or required that the plurality of gas-trapping features 120 to be arranged in such an ordered array or be circular/cylindrical in shape. The plurality of gas-trapping features 120 can, in some embodiments, be randomly arranged on or within surface 100. In some embodiments, the dimensions a, b, H of gas-trapping features 120 can vary from one feature to the next. In addition, the geometry of gas-trapping features 120 is not limited to circular/cylindrical shapes; gas-trapping features 120 may be configured in other shapes, such as, but not limited to irregular shapes, polygonal (e.g., trapezoidal, triangular, diamond, square, rectangular, etc.) shapes, or the like. A non-limiting example of a glass substrate having an array of square gas trapping features is shown in FIG. 5b. Glass substrate 400 comprises an array of gas-trapping features, which are square depressions 420 in surface 410. Square depressions 420, each have a side a and depth H (not shown), and are separated from each other by distance b. Square depressions 420 also intersect surface 410, extend downward from surface 410, and are otherwise isolated from each other.

As used herein, the term "open fraction" refers to the fraction of surface 110 that is open to gas-trapping features 120. For example, for substrate 100 (FIG. 5a) the total area of surface 110 is $c^2$ and the total area of surface 110 that is open to gas-trapping features is $7\pi a^2$. For substrate 100 shown in FIG. 5a, the open fraction f of surface 110 is therefore given by the expression $(7\pi a^2)/c^2$.

The open fraction f of surface 110 is at least about 0.40 and, in some embodiments, in a range from about 0.40 up to about 0.95, with the actual upper limit being set or determined by process capability and mechanical limits of structure. In some embodiments, the open fraction f is greater than 0.70 and less than or equal to about 0.95. In other embodiments, the open fraction f is greater than 0.80 and less than or equal to about 0.95.

In some embodiments, gas-trapping features 120, 420 have a dimension a (e.g., a radius, diameter, edge) at surface 110, 410 that is in a range from about 10 nm up to 100 µm. In those embodiments in which glass substrate 100, 400 is transparent, dimension a (e.g., a cross-sectional dimension, such as the length of a side of a rectangular or square feature (FIG. 5b) or radius of a circular or cylindrical feature (FIG. 5a) is in a range from about 10 nm up to about 500 nm. In some embodiments, separation distance b between adjacent gas-trapping features 120, 420 is in a range from about 1 nm up to about 50 µm. Depth H of gas-trapping features 120, 420, in some embodiments, is in a range from about 10 nm up to about 100 µm. In those embodiments in which glass substrate 100, 400 is transparent, depth H is in a range from about 10 nm up to about 500 nm.

The glass substrate 100 further includes a low surface energy coating 150 disposed on surface 110 and gas-trapping features 120. Coating 150, in some embodiments, comprises at least one of a fluoropolymer or a fluorosilane. Such fluoropolymers and fluorosilanes include, but are not limited to, Teflon and commercially available fluorosilanes such as Dow Corning 2604, 2624, and 2634; DK Optool DSX™; Shintesu OPTRON™; heptadecafluoro silane (manufactured, for example, by Gelest); FLUOROSYL™ (manufactured, for example, by Cytonix); and the like. Such coatings can be applied to surface 110 of glass substrate 100 by dipping, vapor coating, spraying, application with a roller, or other suitable method known in the art.

If, for example, the liquid meniscus rested exactly on the top of the holes or cavities shown in FIGS. 3 and 5a without any penetration, the liquid droplet/meniscus would then correspond to the classical Cassie-Baxter state. The contact angle for the array of circular/cylindrical gas-trapping features shown in FIG. 5a would be given by equation (3), with:

$$f = 1 - \frac{2\pi}{\sqrt{3}} \frac{1}{(2+b/a)^2}, \text{ and} \quad (4)$$

$$r_f = 1. \quad (5)$$

If the liquid in the droplet fully penetrated and completely filled up the cylindrical cavities and assumed the Wenzel configuration, then the contact angle for the array of circular/cylindrical gas-trapping features shown in FIG. 5a is given by equation (2) with $$r_W = 1 + \frac{4\pi}{\sqrt{3} f} \frac{H/a}{(2+b/a)^2}. \quad (6)$$

Figure 6:
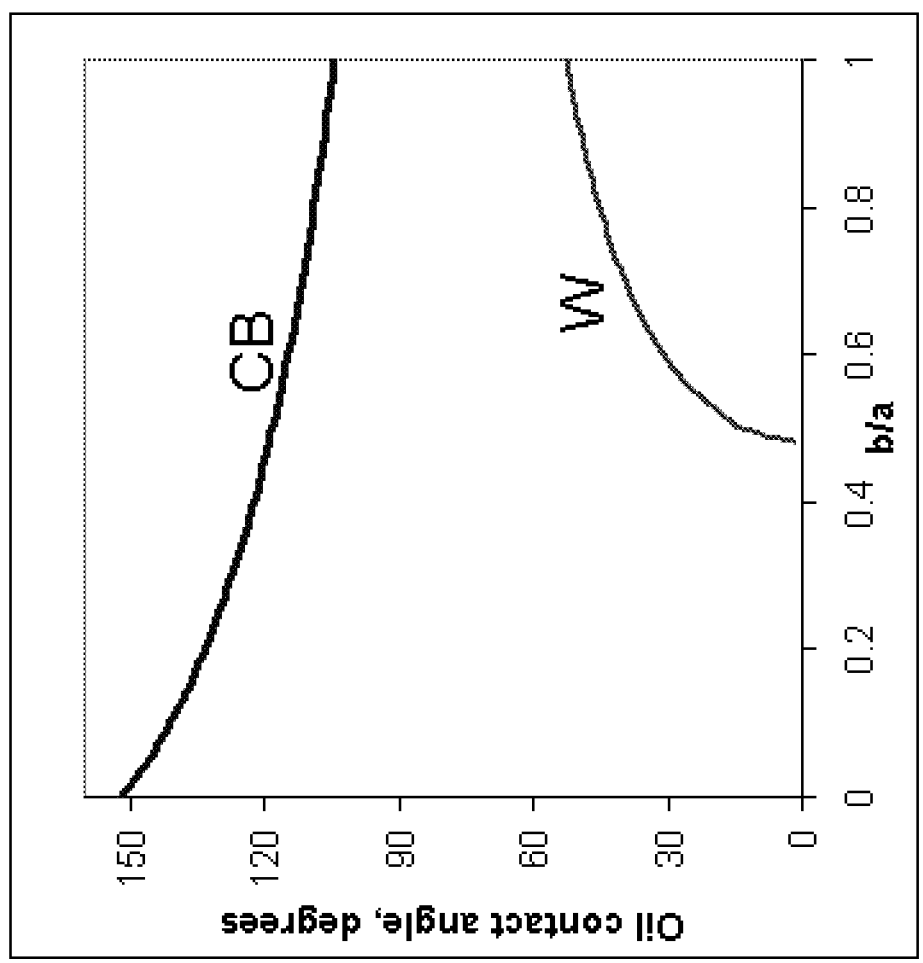

Contact angles calculated for Cassie-Baxter (CB) and Wenzel (W) states are plotted as a function of the b/a ratio in FIG. 6. In these specific, non-limiting examples, H/a=1 and the Young contact angle $\theta_Y$ is 80°. If the liquid 130 fully penetrates and floods gas-trapping features 120, the Wenzel state is achieved. The overall contact angle would then be even smaller than the original Young contact angle $\theta_Y$, and glass substrate 100 will become even more oleophilic than a comparable smooth glass substrate. However, full penetration of gas-trapping features 120 will not occur where the gas-trapping features 120 are isolated from each other and are non-interacting features such as those shown in FIGS. 2, 5a, and 5b. As previously described herein, liquid meniscus 135 penetrates into gas-trapping features 120 to a depth h and the gas molecules are physically trapped. Further penetration by meniscus 135 compresses the gas molecules and raises the pressure of the trapped gas molecules.

Figure 4:
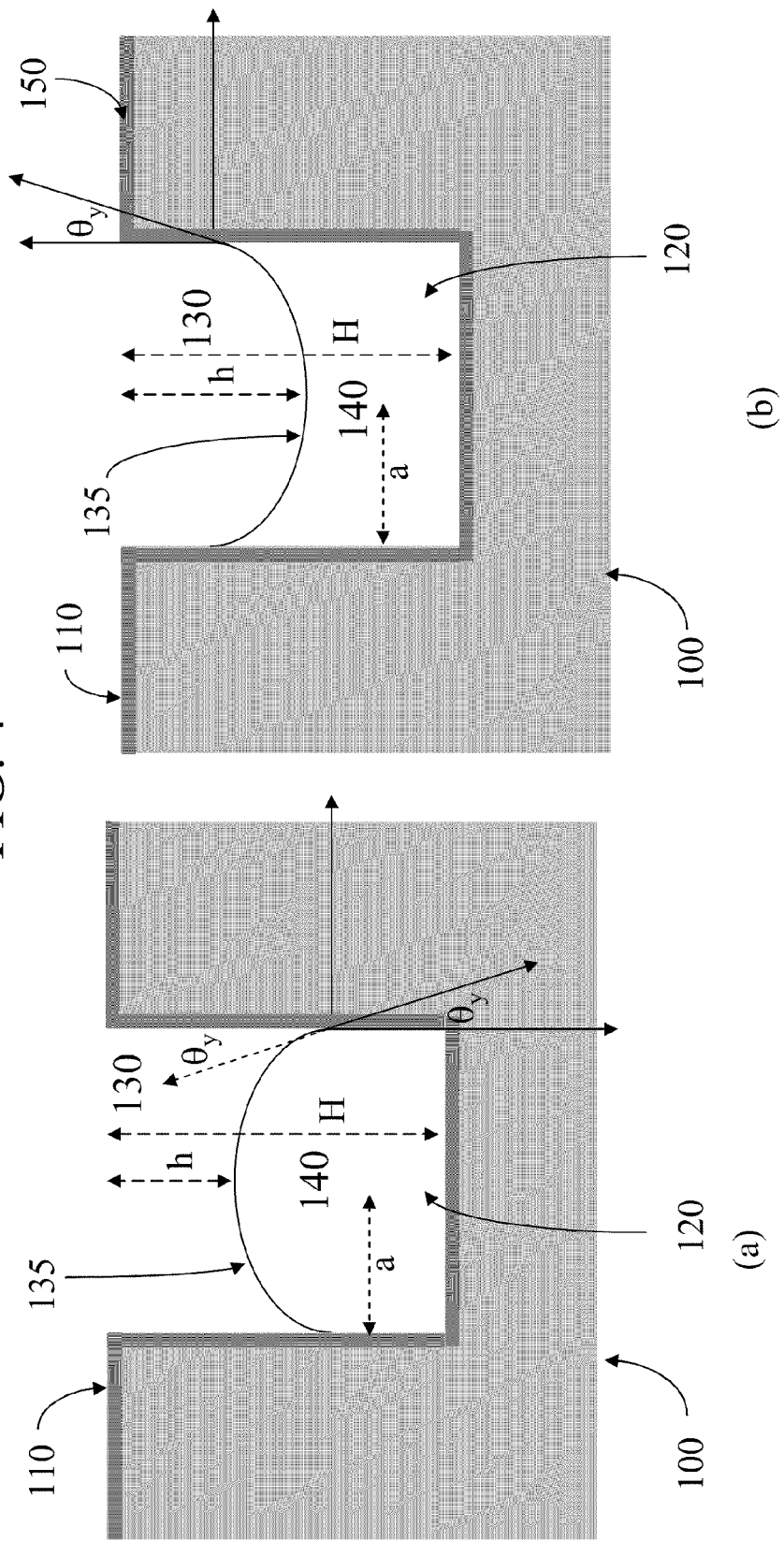
FIG. 4a is a schematic cross-sectional representation of the glass substrate of FIG. 3 in which a liquid meniscus having an downwardly concave shape is formed.
FIG. 4b is a schematic cross-sectional representation of the glass substrate of FIG. 3 in which a liquid meniscus having an upwardly concave shape is formed.

Referring to FIGS. 2a, 4a, and 5a, and assuming that gas 140 follows the ideal gas law, the pressure of the entrapped gas is given by:

$$P_g(h) = \frac{P_{atm} V_{cav}}{V_g(h)} \quad (7)$$

for isothermal compression, where $P_g(h)$ and $V_g(h)$ are the pressure and the volume, respectively, of gas 140, expressed as function of the penetration depth h; $P_{atm}$ is the atmospheric pressure; and $V_{cav}$ is the volume of the cylindrical cavity 120 (FIGS. 3 and 4). Here, $V_{cav}$ is the volume of the cavity which was initially fully occupied by gas and is given by the equation:

$$V_{cav} = \pi a^2 H. \quad (8)$$

$V_g(h)$ is the volume of entrapped gas after the liquid meniscus has penetrated a distance h.

The volume of entrapped gas is given by:

$$V_g = \pi a^2(H-h) + V_{cap}. \quad (9)$$

The cap volume is the volume of gas under the hemispherical cap:

$$V_{cap} = \frac{\pi}{6} a^3 \left[ 3 \frac{1-\sin\theta_Y}{\cos\theta_Y} + \left(\frac{1-\sin\theta_Y}{\cos\theta_Y}\right)^3 \right] = \frac{\pi}{6} a^3 F(\theta_Y). \quad (10)$$

At equilibrium, force balance yields:

$$P_g(h^*) - P_\infty = \frac{2\sigma \cos\theta_Y}{a}, \quad (11)$$

where $P_g(h^*)$ is the pressure in the entrapped gas, which is a function of the equilibrium distance h* that the meniscus could penetrate into the cavity/gas-trapping feature 120; P∞ is the atmospheric pressure; and 'a' is the radius of the cylindrical cavity.

The solution of equilibrium penetration depth is given by:

$$\frac{h^*}{H} = \frac{2\sigma\cos\theta_Y}{aP_\infty + 2\sigma\cos\theta_Y} + \frac{aF(\theta_Y)}{6H}, \quad (12)$$

where h* is the equilibrium penetration depth. The equilibrium penetration depth h* is the maximum depth that the liquid meniscus can penetrate into cavity 120 before being stopped by the pressure of the compressed gas inside cavity/gas-trapping feature 120.

Figure 7:
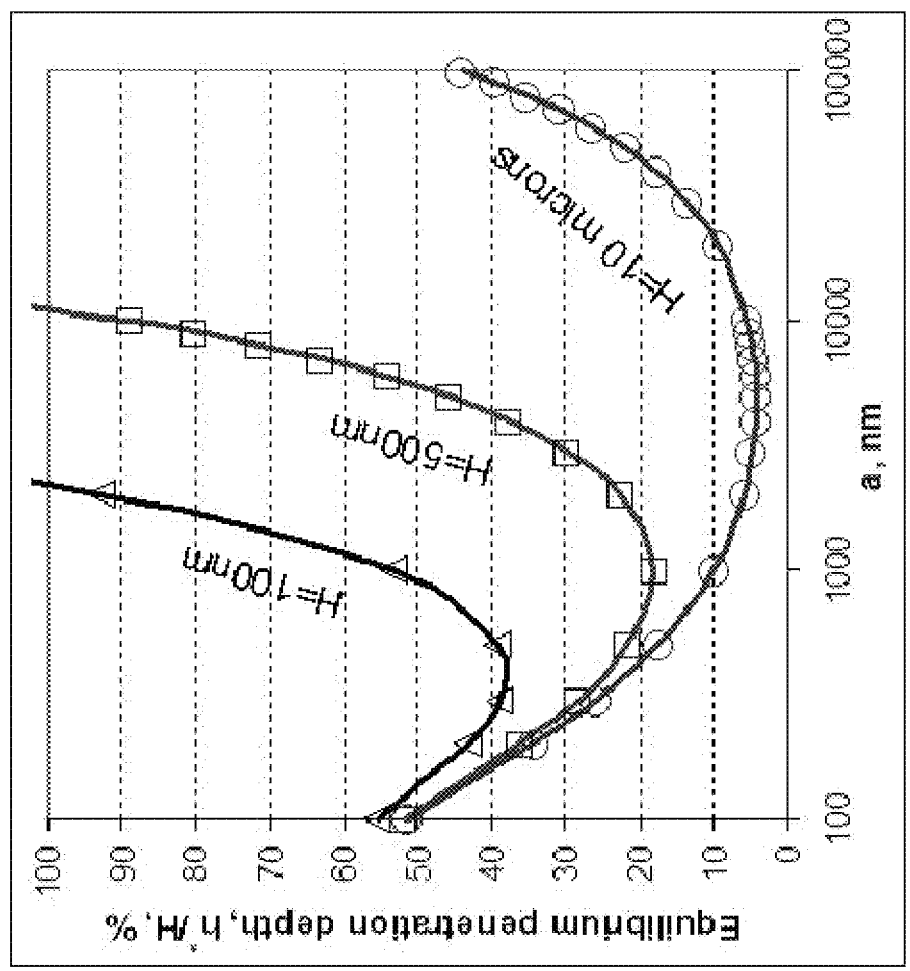
FIG. 7 is a plot of calculated equilibrium penetration depth as a function of cavity radius and height for cylindrical cavities.

The calculated equilibrium penetration depth h* for cylindrical cavities is shown in FIG. 7 as function of cavity radius and height H. The cavity penetration depth is expressed as the percentage penetration (h*/H) of cavity height H. In general, larger cavity radius and smaller cavity depth lead to smaller penetration depth. The smaller depth and larger radius lead to a greater rate of increase of the pressure in the compressed gas as function of penetration depth. The greater the rise in pressure per unit penetration depth, the lower the penetration depth.

The pressure buildup in the compressed gas inside cavities/gas-trapping features 120 thus stops the complete transition of fluid drops in these non-interacting cavities from the Cassie-Baxter state to into the Wenzel state. This assures the maintenance of a large surface fraction of the suspended liquid-air (i.e., gas) interface, although part of the interface can be suspended inside the cavity. As long as there is a high fraction of liquid-air interface, the contact angle would be high irrespective of whether the liquid-air interface is at the top of the cavity (i.e., a perfect Cassie-Baxter state) or partially inside the cavity. This partially invaded equilibrium state is also referred to herein as the partially wetted (PW) state.

This can be seen from the calculation of the overall contact angle corresponding to the equilibrium penetration depth h*, which can be calculated from equation (12). Once the value of h* is known, the overall contact angle of the partially wetted state could be approximately calculated as:

$$\cos\theta_{PW} = -1 + f(1 + r_f \cos\theta_Y), \quad (13)$$

with $$r_f = 1 + \frac{4\pi}{\sqrt{3}f}\frac{h^*/a}{(2+b/a)^2}. \quad (14)$$

Figure 8:
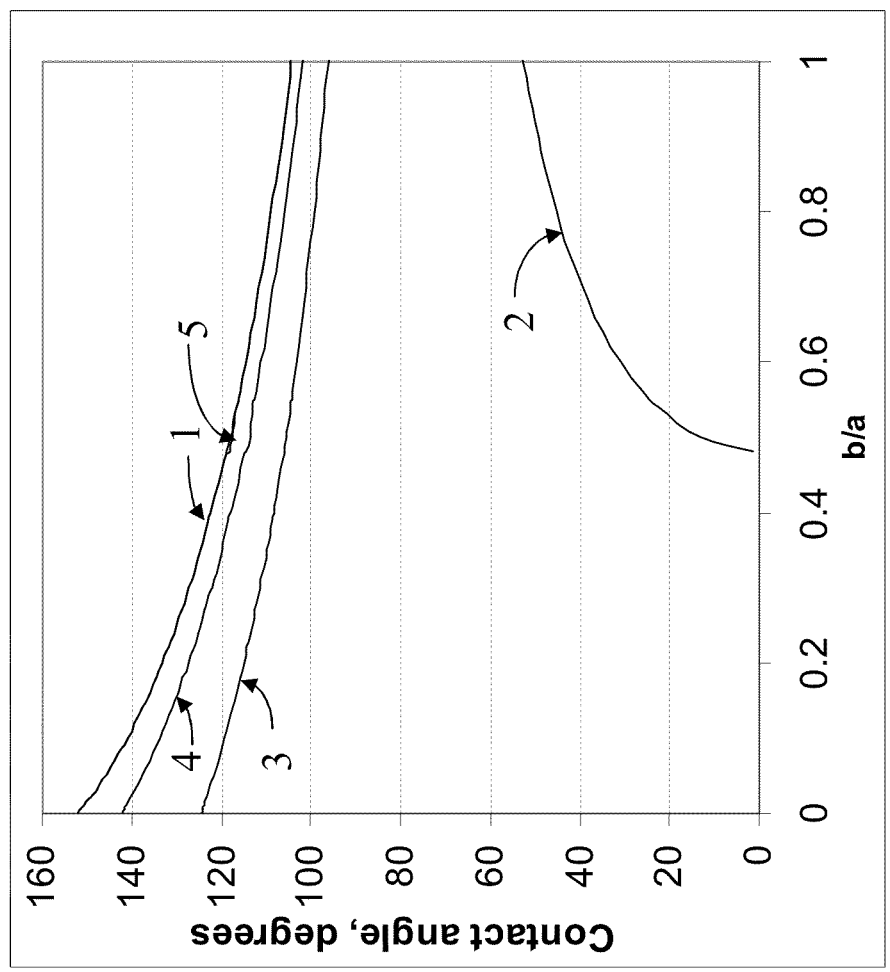
FIG. 8 is a plot of calculated contact angles as function of the b/a ratio for different cavity designs.

Calculated contact angles corresponding to various cavity designs are plotted as function of the b/a ratio in FIG. 8. Line 1 in FIG. 8 corresponds to the ideal Cassie-Baxter case where there is no penetration of the liquid meniscus into the cavities. This state offers the highest contact angle. Line 2 in FIG. 8 corresponds to the Wenzel state, which would occur if the oil had completely invaded and filled up the cavities. This state, which would occur in the absence of physically trapping gas, leads to low contact angles for oil and is therefore not desirable. Lines 3, 4, and 5 (line 5 overlaps line 1) in FIG. 8 correspond to the partially wetted states for cylinder radii of 100 nm, 1 µm, and 10 µm, respectively. The contact angle values corresponding to these PW states are close to that of the Cassie-Baxter state, even though oil has partially penetrated into the cavities. For the glass substrate to behave like an oleophobic and/or super-oleophobic surface, the behavior illustrated by lines 3, 4, and 5 in FIG. 8 is desirable. Maintaining contact angle values of oil close to the ideal Cassie-Baxter state using the surfaces described herein does not require any complex reentrant geometry, and is important for developing economically feasible smart surfaces with oil repellant properties.

Figure 9:
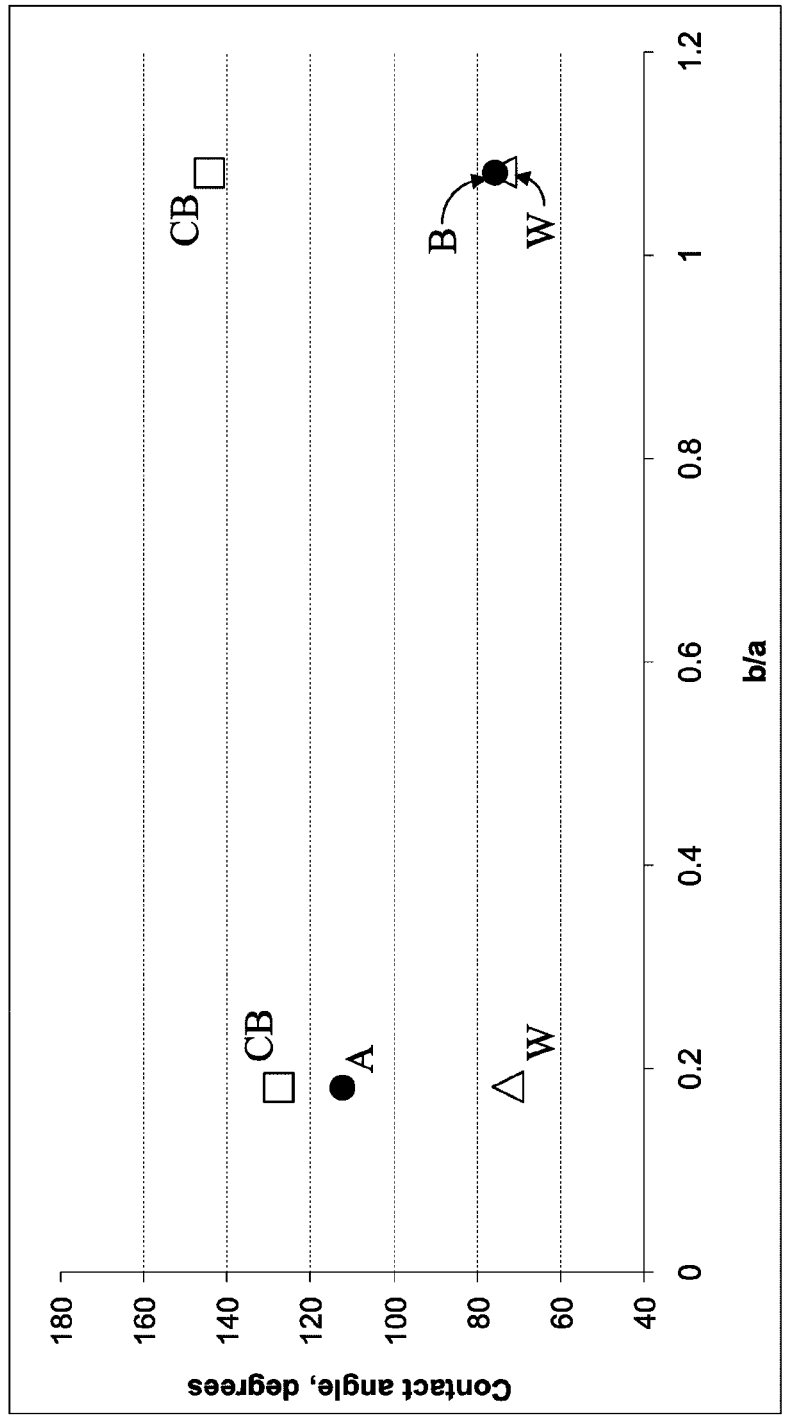
FIG. 9 is a plot of contact angles of oil droplets on substrate surfaces as a function of the ratio b/a, where b is the separation distance between adjacent features and a is the cross-sectional dimension of the features on the surface.

The contact angles obtained for oil droplets on a substrate having square or "waffle-like" gas-trapping features 120, such as those shown in FIG. 5*b* and for oil droplets on a surface that includes posts (as shown in FIGS. 2*a* and *b*) are plotted in FIG. 9 as a function of the b/a ratio of the features, where b is the separation distance of features 120, 420, or 300 to the cross-sectional dimension a of said features. The surface of the substrate surface having waffle-like gas-trapping features is oleophobic, producing a contact angle (A in FIG. 9) approximately 110°. In contrast, the substrate having posts produces a contact angle (B in FIG. 9) of less than 80° and is therefore oleophilic. Contact angles calculated for the Wenzel (W in FIG. 9) and Cassie-Baxter (CB in FIG. 9) states are also plotted in FIG. 9 for the b/a ratios of the gas-trapping and post features. The contact angle B for the surface having reentrant geometry is essentially the same as the contact angle W predicted for the Wenzel state, whereas contact angle A is closer to the contact angle CB predicted for the Cassie-Baxter state than contact angle W, thus indicating that transition of the oil droplets form the Cassie-Baxter state to the Wenzel state has been stopped and that the surface is only partially wetted.

In some embodiments, gas-trapping features 120 are cavities or depressions that are formed by laser ablation of portions of the surface of the glass substrate. When formed by a continuous wave laser such as a $CO_2$, YAG, or UV excimer laser, material is ablated in a thermal ablation mode and the surfaces of the depressions or cavities are fire polished. The formation of depressions by laser ablation is described in U.S. Published Patent Application 2008/0047940, filed on Jun. 20, 2007, by Xinghua Li et al. and entitled "Article with Multiple Surface Depressions and Method for Making the Same," the contents of which are incorporated herein by reference in their entirety.

In another embodiment, gas-trapping features 120, such as depressions, cavities, holes, and the like are formed by embossing a surface of the glass substrate. The embossing process includes heating a glass substrate to a temperature at which the viscosity of the glass is in a range from about $10^5$ poise to about $10^8$ poise. For a glass substrate, this temperature is typically near the softening point (i.e., the temperature at which the viscosity of the glass is $10^{7.6}$ poise) of the glass. The softened surface is brought into contact with a textured or templated surface of a mold at some predetermined load to transfer an impression of the textured surface into the glass surface. To produce gas-trapping features such as those described herein, the surface of the mold, in one embodiment, comprise a plurality of protrusions. In some embodiments, the protrusions (or texture of the mold) are arranged in a regular array. The embossed surface of the glass substrate is typically a continuous surface that is free of any undercutting or fracture surfaces that typically comprise a reentrant geometry. The dimensions (e.g., laterally varying orientation and depth) of the gas-trapping features can be controlled by controlling the pressure exerted by the mold on the glass substrate during embossing. Embossing of glass substrates is described in U.S. patent application Ser. No. 12/624,978, filed on Nov. 24, 2009, by Glen Bennett Cook et al. and entitled "Embossed Glass Articles for Anti-Fingerprinting Applications and Methods of Making," which claims priority from U.S. Provisional Patent Application No. 61/175,101, filed on May 4, 2009, and having the same title, the contents of which are incorporated herein by reference in their entirety.

In some embodiments, the glass substrate is an alkali aluminosilicate glass. In one embodiment, the alkali aluminosilicate glass substrate comprises, consists essentially of, or consists of: 60-72 mol % $SiO_2$; 9-16 mol % $Al_2O_3$; 5-12 mol % $B_2O_3$; 8-16 mol % $Na_2O$; and 0-4 mol % $K_2O$, wherein the ratio $$\frac{Al_2O_3(mol\ \%) + B_2O_3(mol\ \%)}{\sum alkali\ metal\ modifiers(mol\ \%)} > 1,$$

where the alkali metal modifiers are alkali metal oxides. In another embodiment, the alkali aluminosilicate glass substrate comprises, consists essentially of, or consists of: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % $MgO$; and 0-3 mol % $CaO$. In yet another embodiment, the alkali aluminosilicate glass substrate comprises, consists essentially of, or consists of: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % $MgO$; 0-10 mol % $CaO$; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %≤$Li_2O+Na_2O+K_2O$≤20 mol % and 0 mol %≤$MgO+CaO$≤10 mol %. In another embodiment, the alkali aluminosilicate glass substrate comprises, consists essentially of, or consists of: 64-68 mol % $SiO_2$; 12-16 mol % $Na_2O$; 8-12 mol % $Al_2O_3$; 0-3 mol % $B_2O_3$; 2-5 mol % $K_2O$; 4-6 mol % $MgO$; and 0-5 mol % $CaO$, wherein: 66 mol %≤$SiO_2+B_2O_3+CaO$≤69 mol %; $Na_2O+K_2O+B_2O_3+MgO+CaO+SrO$>10 mol %; 5 mol %≤$MgO+CaO+SrO$≤8 mol %; $(Na_2O+B_2O_3)-Al_2O_3$≤2 mol %; 2 mol %≤$Na_2O-Al_2O_3$≤6 mol %; and 4 mol %≤$(Na_2O+K_2O)-Al_2O_3$≤10 mol %. In yet another embodiment, the alkali aluminosilicate glass comprises, consists essentially of, or consists of: 50-80 wt % $SiO_2$; 2-20 wt % $Al_2O_3$; 0-15 wt % $B_2O_3$; 1-20 wt % $Na_2O$; 0-10 wt % $Li_2O$; 0-10 wt % $K_2O$; and 0-5 wt % $(MgO+CaO+SrO+BaO)$; 0-3 wt % $(SrO+BaO)$; and 0-5 wt % $(ZrO_2+TiO_2)$, wherein 0≤$(Li_2O+K_2O)/Na_2O$≤0.5.

The alkali aluminosilicate glass is, in some embodiments, substantially free of lithium, whereas in other embodiments, the alkali aluminosilicate glass is substantially free of at least one of arsenic, antimony, and barium. In some embodiments, the glass article is down-drawn, using those methods known in the art such as, but not limited to fusion-drawing, slot-drawing, re-drawing, and the like, and has a liquid viscosity of at least 135 kpoise.

Non-limiting examples of such alkali aluminosilicate glasses are described in U.S. patent application Ser. No. 11/888,213, by Adam J. Ellison et al., entitled "Down-Drawable, Chemically Strengthened Glass for Cover Plate," filed on Jul. 31, 2007, which claims priority from U.S. Provisional Patent Application 60/930,808, filed on May 22, 2007, and having the same title; U.S. patent application Ser. No. 12/277,573, by Matthew J. Dejneka et al., entitled "Glasses Having Improved Toughness and Scratch Resistance," filed on Nov. 25, 2008, which claims priority from U.S. Provisional Patent Application 61/004,677, filed on Nov. 29, 2007, and having the same title; U.S. patent application Ser. No. 12/392,577, by Matthew J. Dejneka et al., entitled "Fining Agents for Silicate Glasses," filed Feb. 25, 2009, which claims priority from U.S. Provisional Patent Application No. 61/067,130, filed Feb. 26, 2008, and having the same title; U.S. patent application Ser. No. 12/393,241 by Matthew J. Dejneka et al., entitled "Ion-Exchanged, Fast Cooled Glasses," filed Feb. 25, 2009, which claims priority from U.S. Provisional Patent Application No. 61/067,732, filed Feb. 29, 2008, and having the same title; U.S. patent application Ser. No. 12/537,393, by Kristen L. Barefoot et al., entitled "Strengthened Glass Articles and Methods of Making," filed Aug. 7, 2009, which claims priority from U.S. Provisional Patent Application No. 61/087,324, entitled "Chemically Tempered Cover Glass," filed Aug. 8, 2008; U.S. Provisional Patent Application No. 61/235,767, by Kristen L. Barefoot et al., entitled "Crack and Scratch Resistant Glass and Enclosures Made Therefrom," filed Aug. 21, 2009; and U.S. Provisional Patent Application No. 61/235,762, by Matthew J. Dejneka et al., entitled "Zircon Compatible Glasses for Down Draw," filed Aug. 21, 2009; the contents of which are incorporated herein by reference in their entirety.

In one embodiment, the glass substrate is ion exchangeable and can be either thermally or chemically strengthened before or after formation of the gas-trapping features, whereas, in other embodiments, the glass substrate is either chemically of thermally strengthened. The strengthened glass substrate has strengthened surface layers extending from a first surface and a second surface to a depth of layer below each surface. The strengthened surface layers are under compressive stress, whereas a central region of the glass substrate is under tension, or tensile stress, so as to balance forces within the glass. In thermal strengthening (also referred to herein as "thermal tempering"), the glass substrate is heated up to a temperature that is greater than the strain point of the alkali aluminosilicate glass but below the softening point of the glass and then rapidly cooled to a temperature below the strain point to create strengthened layers at the surfaces of the glass substrate. In another embodiment, the alkali aluminosilicate glass substrate can be strengthened chemically by a process known as ion exchange. In this process, ions in the surface layer of the glass are replaced by—or exchanged with—larger ions having the same valence or oxidation state. In those embodiments in which the glass substrate comprises, consists essentially of, or consists of an alkali aluminosilicate glass, ions in the surface layer of the glass and the larger ions are monovalent alkali metal cations, such as $Li^+$ (when present in the glass), $Na^+$, $K^+$, $Rb^+$, and $Cs^+$. Alternatively, monovalent cations in the surface layer may be replaced with monovalent cations other than alkali metal cations, such as $Ag^+$ or the like.

Ion exchange processes typically comprise immersing the alkali aluminosilicate glass substrate or article in a molten salt bath containing the larger ions to be exchanged with the smaller ions in the glass. It will be appreciated by those skilled in the art that parameters for the ion exchange process including, but not limited to, bath composition and temperature, immersion time, the number of immersions of the glass in a salt bath (or baths), use of multiple salt baths, additional steps such as annealing, washing, and the like, are generally determined by the composition of the glass and the desired depth of layer and compressive stress of the glass to be achieved by the strengthening operation. By way of example, ion exchange of alkali metal-containing glasses may be achieved by immersion in at least one molten salt bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 16 hours. However, temperatures and immersion times different from those described above may also be used. Such ion exchange treatments typically result in strengthened alkali aluminosilicate glasses having depths of layer ranging from about 10 μm up to at least 50 μm with a compressive stress ranging from about 200 MPa up to about 800 MPa, and a central tension of less than about 100 MPa.

Non-limiting examples of ion exchange processes are provided in the U.S. patent applications and provisional patent applications that have been previously referenced hereinabove. Additional non-limiting examples of ion exchange processes in which glass is immersed in multiple ion exchange baths, with washing and/or annealing steps between immersions, are described in U.S. patent application Ser. No. 12/500,650, by Douglas C. Allan et al., entitled "Glass with Compressive Surface for Consumer Applications," filed Jul. 10, 2009, which claims priority from U.S. Provisional Patent Application No. 61/079,995, filed Jul. 11, 2008, and having the same title, in which glass is strengthened by immersion in multiple, successive, ion exchange treatments in salt baths of different concentrations; and U.S. patent application Ser. No. 12/510,599, by Christopher M. Lee et al., entitled "Dual Stage Ion Exchange for Chemical Strengthening of Glass," filed Jul. 28, 2009, which claims priority from U.S. Provisional Patent Application No. 61/084,398, filed Jul. 29, 2008, and having the same title, in which glass is strengthened by ion exchange in a first bath is diluted with an effluent ion, followed by immersion in a second bath having a smaller effluent ion concentration than the first bath. The contents of U.S. Provisional patent application Ser. Nos. 12/500,650 and 12/510,599 are incorporated herein by reference in their entirety.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass substrate comprising an oleophobic surface, wherein the oleophobic surface is substantially free of features that form a reentrant geometry and comprises a plurality of gas-trapping features, wherein the plurality of gas-trapping features are open to the oleophobic surface and extend to a depth below the oleophobic surface, and are isolated from each other, and wherein the oleophobic surface comprises an open fraction of at least 0.4.

2. The glass substrate of claim 1, further comprising a coating disposed on the surface and the plurality of gas trapping features, the coating comprising at least one of a low surface energy fluoropolymer and a low surface energy fluorosilane.

3. The glass substrate of claim 2, wherein each of the gas-trapping features comprise at least one wall defining a cavity therein, and wherein the coating is disposed on the at least one wall.

4. The glass substrate of claim 2, wherein each of the gas-trapping features has a cross-sectional dimension a at the surface, and wherein the dimension a is in a range from about 10 nm up to about 100 μm.

5. The glass substrate of claim 2, wherein each of the gas-trapping features extends into the glass substrate to a depth H from the surface, and wherein the depth H is in a range from about 10 nm up to about 100 μm.

6. The glass substrate of claim 2, wherein the plurality of gas-trapping surfaces is arranged in a regular array.

7. The glass substrate of claim 6, wherein adjacent gas-trapping features in the regular array are separated by a distance b, and wherein distance b is in a range from about 10 nm to about 50 μm.

8. The glass substrate of claim 2, wherein the plurality of gas-trapping features are formed by laser ablation of the surface.

9. The glass substrate of claim 8, wherein each of the gas-trapping features has at least one fire polished surface.

10. The glass substrate of claim 2, wherein the plurality of features are embossed into the surface.

11. The glass substrate of claim 1, wherein the glass substrate comprises an alkali aluminosilicate glass.

12. The glass substrate of claim 1, wherein the oleophobic surface is a superoleophobic surface.

13. A glass substrate having an oleophobic surface, the oleophobic surface comprising:
  a. a surface, wherein the surface is substantially free of features that form a reentrant geometry, and wherein the surface has an open fraction of at least 0.40;
  b. a plurality of gas-trapping features, wherein each of the gas-trapping features is open to the surface and extends to a depth below the surface, and wherein the features are isolated from each other; and
  c. a coating disposed on the surface and the plurality of gas trapping features, the coating comprising at least one of a low surface energy fluoropolymer and a low surface energy fluorosilane.

14. The glass substrate of claim 13, wherein each of the gas-trapping features comprise at least one wall defining a cavity therein, and wherein the coating is disposed on the at least one wall.

15. The glass substrate of claim 13, wherein each of the gas-trapping features has a cross-sectional dimension a at the surface, and wherein the dimension a is in a range from about 10 nm up to about 100 μm.

16. The glass substrate of claim 13, wherein each of the gas-trapping features extends into the glass substrate to a depth H from the surface, and wherein the depth H is in a range from about 10 nm up to about 100 μm.

17. The glass substrate of claim 13, wherein the plurality of gas-trapping surfaces is arranged in a regular array.

18. The glass substrate of claim 17, wherein adjacent gas-trapping features in the regular array are separated by a distance b, and wherein distance b is in a range from about 10 nm to about 50 μm.

19. The glass substrate of claim 13, wherein the plurality of gas-trapping features are formed by laser ablation a portion of the surface.

20. The glass substrate of claim 19, wherein each of the gas-trapping features has at least one fire polished surface.

21. The glass substrate of claim 13, wherein the plurality of features are embossed into the surface.

22. The glass substrate of claim 13, wherein the glass substrate comprises an alkali aluminosilicate glass.

23. The glass substrate of claim 13, wherein the oleophobic surface is a superoleophobic surface.

24. A method of making a glass substrate having an oleophobic surface, the method comprising the steps of:
  a. providing a glass substrate having a surface;
  b. forming a plurality of gas-trapping features in the surface, wherein each of the gas-trapping features is open to the surface and extends to a depth below the surface, wherein the features are isolated from each other, and wherein the surface has an open fraction of at least 0.40 after forming the plurality of gas-trapping features; and
  c. coating the surface and the plurality of gas trapping features with at least one of a low surface energy fluoropolymer and a low surface energy fluorosilane to form the oleophobic surface on the glass substrate.

25. The method of claim 24, wherein the step of providing a surface comprises providing a surface that is substantially free of features that form a reentrant geometry.

26. The method of claim 24, wherein the step of forming a plurality of gas-trapping features in the surface comprises laser ablating a portion of the surface to form the gas-trapping features.

27. The method of claim 24, wherein the step of forming a plurality of gas-trapping features in the surface comprises embossing the gas trapping features into the surface.

* * * * *